US009598005B2

(12) United States Patent
Kizaki et al.

(10) Patent No.: US 9,598,005 B2
(45) Date of Patent: Mar. 21, 2017

(54) TURN SIGNAL CONTROL APPARATUS AND METHOD OF CONTROLLING TURN SIGNAL

(71) Applicant: HONDA MOTOR CO., LTD., Tokyo (JP)

(72) Inventors: Tokujiro Kizaki, Wako (JP); Atsushi Nishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/961,886

(22) Filed: Dec. 8, 2015

(65) Prior Publication Data
US 2016/0167569 A1    Jun. 16, 2016

(30) Foreign Application Priority Data
Dec. 10, 2014 (JP) ................................. 2014-250101

(51) Int. Cl.
*B60Q 1/38* (2006.01)
*B60Q 1/44* (2006.01)
*B60Q 1/46* (2006.01)
*B60Q 1/34* (2006.01)

(52) U.S. Cl.
CPC ............... *B60Q 1/343* (2013.01); *B60Q 1/38* (2013.01); *B60Q 1/385* (2013.01); *B60Q 1/448* (2013.01); *B60Q 1/46* (2013.01)

(58) Field of Classification Search
USPC ....... 340/475, 471, 463, 468, 464, 458, 467, 340/469, 477, 479
See application file for complete search history.

(56) References Cited

U.S. PATENT DOCUMENTS

| 4,037,195 | A | * | 7/1977 | Wojslawowicz | ....... | B60Q 1/385 340/471 |
| 4,087,784 | A | * | 5/1978 | West | ........................ | B60Q 1/44 340/471 |
| 4,127,844 | A | * | 11/1978 | Purdy | ...................... | B60Q 1/46 340/471 |
| 4,325,007 | A | * | 4/1982 | Prohaska | ................. | B60Q 1/46 315/200 A |

(Continued)

FOREIGN PATENT DOCUMENTS

JP    2013-129396    7/2013

*Primary Examiner* — Fekadeselassie Girma
(74) *Attorney, Agent, or Firm* — Mori & Ward, LLP (57) ABSTRACT

A turn signal control apparatus includes a switch, a flashing cycle control device, an operation device, a sharp deceleration-detection device, a bypass device, and a flashing cycle modification device. The flashing cycle control device is to determine a flashing cycle. The operation device is to open and close the switch according to the flashing cycle determined by the flashing cycle control device so that a turn signal lamp flashes. The flashing cycle modification device is to modify the flashing cycle determined by the flashing cycle control device to produce a modified flashing cycle according to a sharp deceleration-detection signal. The flashing cycle modification device and the bypass device are configured to operate to electrically connect an upstream side of the operation device and a downstream side of the operation device according to the modified flashing cycle in a case where the sharp deceleration-detection signal is outputted.

20 Claims, 7 Drawing Sheets

(56) References Cited

U.S. PATENT DOCUMENTS

| | | | | |
|---|---|---|---|---|
| 4,825,191 | A * | 4/1989 | Ching-Hwei | B60Q 7/00 340/472 |
| 5,731,755 | A * | 3/1998 | Boxer | B60Q 1/38 340/465 |
| 5,790,017 | A * | 8/1998 | Berryhill | B60Q 1/38 340/474 |
| 6,069,559 | A * | 5/2000 | Davis | B60Q 11/007 340/468 |
| 6,884,986 | B2 * | 4/2005 | Doczy | B60Q 1/1469 200/61.32 |
| 6,972,674 | B2 * | 12/2005 | Ohmi | B60Q 11/007 315/77 |
| 8,106,760 | B2 * | 1/2012 | Ekchian | B60Q 1/34 340/463 |
| 2002/0000912 | A1 * | 1/2002 | DeYoung | B60Q 1/46 340/471 |
| 2005/0099286 | A1 * | 5/2005 | DeYoung | B60Q 1/46 340/463 |
| 2006/0091817 | A1 * | 5/2006 | Herrig | B60Q 1/34 315/200 A |
| 2007/0194904 | A1 * | 8/2007 | Wey | B60Q 1/448 340/467 |
| 2015/0075954 | A1 * | 3/2015 | Mizuno | B60Q 1/343 200/61.3 |
| 2016/0023589 | A1 * | 1/2016 | Warner | B60Q 1/0094 315/77 |

\* cited by examiner

TURN SIGNAL CONTROL APPARATUS AND METHOD OF CONTROLLING TURN SIGNAL

CROSS-REFERENCE TO RELATED APPLICATIONS

The present application claims priority under 35 U. S. C. §119 to Japanese Patent Application No. 2014-250101, filed Dec. 10, 2014. The contents of this application are incorporated herein by reference in their entirety.

BACKGROUND OF THE INVENTION

Field of the Invention

The present invention relates to a turn signal control apparatus and a method of controlling a turn signal.

Discussion of the Background

Heretofore, there has been known a method of notifying following and other vehicles of sharp deceleration of a vehicle by activating a hazard lamp, which is simultaneous flashing of the vehicle's left and right turn signal devices.

Japanese Unexamined Patent Application Publication No. 2013-129396 discloses a turn signal control device that automatically activates a hazard lamp without a rider's operation, by using, as a trigger, a state where a predetermined sharp-deceleration condition consisting of vehicle speed and deceleration speed is met. Hereinafter, such activation of a hazard lamp is referred to as an "emergency stop signal function (ESS function)."

SUMMARY OF THE INVENTION

According to one aspect of the present invention, a turn signal control apparatus includes a circuit, sharp deceleration-detection means, bypass means, and flashing cycle modification means. In the circuit, a turn signal lamp is connected to the downstream side of a power source through a switch and operation means. The operation means is turned on to open and close the switch according to a flashing cycle determined by flashing cycle control means, so that the turn signal lamp flashes. The sharp deceleration-detection means is configured to output a sharp deceleration-detection signal when sharp deceleration of a vehicle is detected. The bypass means connects the upstream side of the operation means and the downstream side of the operation means. The flashing cycle modification means is configured to modify the flashing cycle determined by the flashing cycle control means, according to output of the sharp deceleration-detection signal. When the sharp deceleration-detection signal is outputted, both the flashing cycle modification means and the bypass means are activated, to connect the upstream side of the operation means and the downstream side of the operation means according to the modified flashing cycle.

According to another aspect of the present invention, a turn signal control apparatus includes a switch, a flashing cycle control device, an operation device, a sharp deceleration-detection device, a bypass device, and a flashing cycle modification device. The switch is to flash a turn signal lamp. The flashing cycle control device is to determine a flashing cycle. The operation device is to open and close the switch according to the flashing cycle determined by the flashing cycle control device so that the turn signal lamp flashes. The sharp deceleration-detection device is to output a sharp deceleration-detection signal in a case where sharp deceleration of a vehicle is detected. The bypass device is to electrically connect an upstream side of the operation device and a downstream side of the operation device. The flashing cycle modification device is to modify the flashing cycle determined by the flashing cycle control device to produce a modified flashing cycle according to the sharp deceleration-detection signal. The flashing cycle modification device and the bypass device are configured to operate to electrically connect the upstream side of the operation device and the downstream side of the operation device according to the modified flashing cycle in a case where the sharp deceleration-detection signal is outputted.

According to further aspect of the present invention, a method of controlling a turn signal includes determining a flashing cycle. A switch is opened and closed to flash a turn signal lamp according to the flashing cycle. A sharp deceleration-detection signal is outputted in a case where sharp deceleration of a vehicle is detected. The flashing cycle is modified to produce a modified flashing cycle according to the sharp deceleration-detection signal. A flashing cycle modification device and a bypass device are operated to electrically connect an upstream side of an operation device and a downstream side of the operation device according to the modified flashing cycle in a case where the sharp deceleration-detection signal is outputted. The flashing cycle modification device is to modify the flashing cycle to produce the modified flashing cycle according to the sharp deceleration-detection signal. The bypass device is to electrically connect the upstream side of the operation device and the downstream side of the operation device. The operation device is to open and close the switch according to the flashing cycle so that the turn signal lamp flashes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
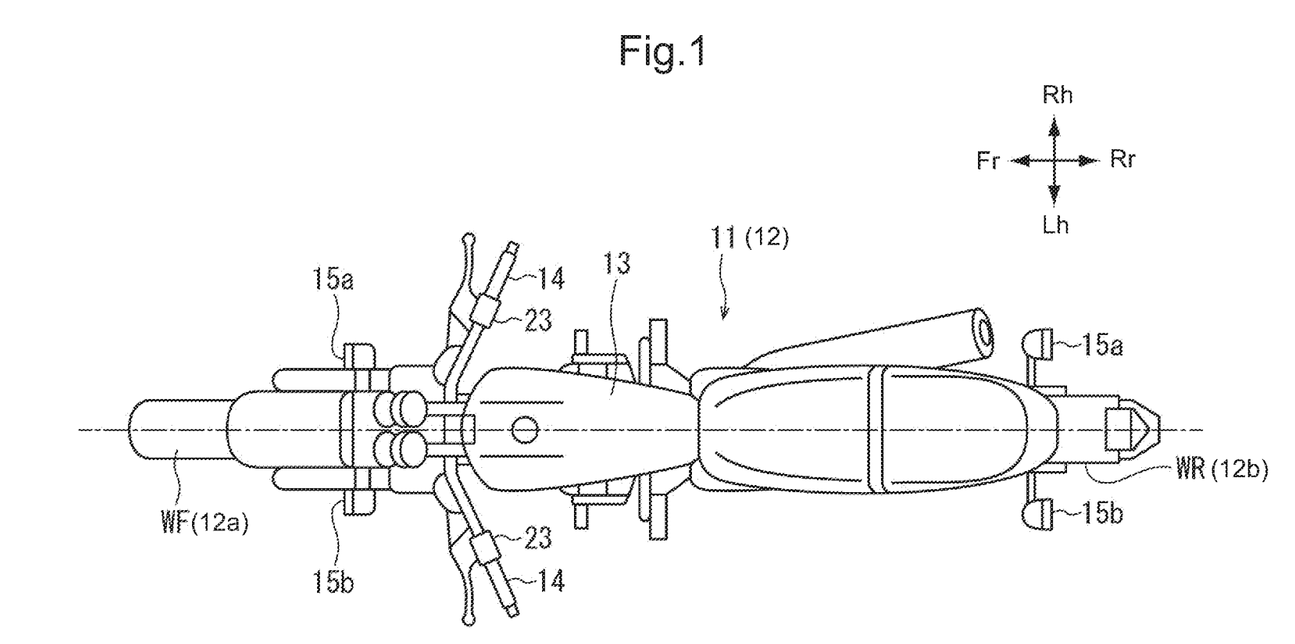
FIG. 1 is a plan view of a motorcycle to which a turn signal control device is applied.

Hereinafter, an embodiment of the present invention will be described in detail with reference to the drawings. FIG. 1 is a plan view of a motorcycle 11 to which a turn signal control device according to the embodiment is applied. A front wheel 12a and a rear wheel 12b are provided at the front and rear of a vehicle body 12 of the motorcycle 11. A handle 14 for steering the front wheel 12a is arranged in front of a seat 13 on which a rider sits.

Right turn signal lamps 15a, 15a constituting a turn signal device are provided at the front and rear, on the right side in the vehicle width direction of the vehicle body 12, while left turn signal lamps 15b, 15b are provided at the front and rear, on the left side in the vehicle width direction of the vehicle body 12. A switch unit 23 having operation means (an operation device) for operating the turn signal device is attached to the handle 14.

Figure 2:
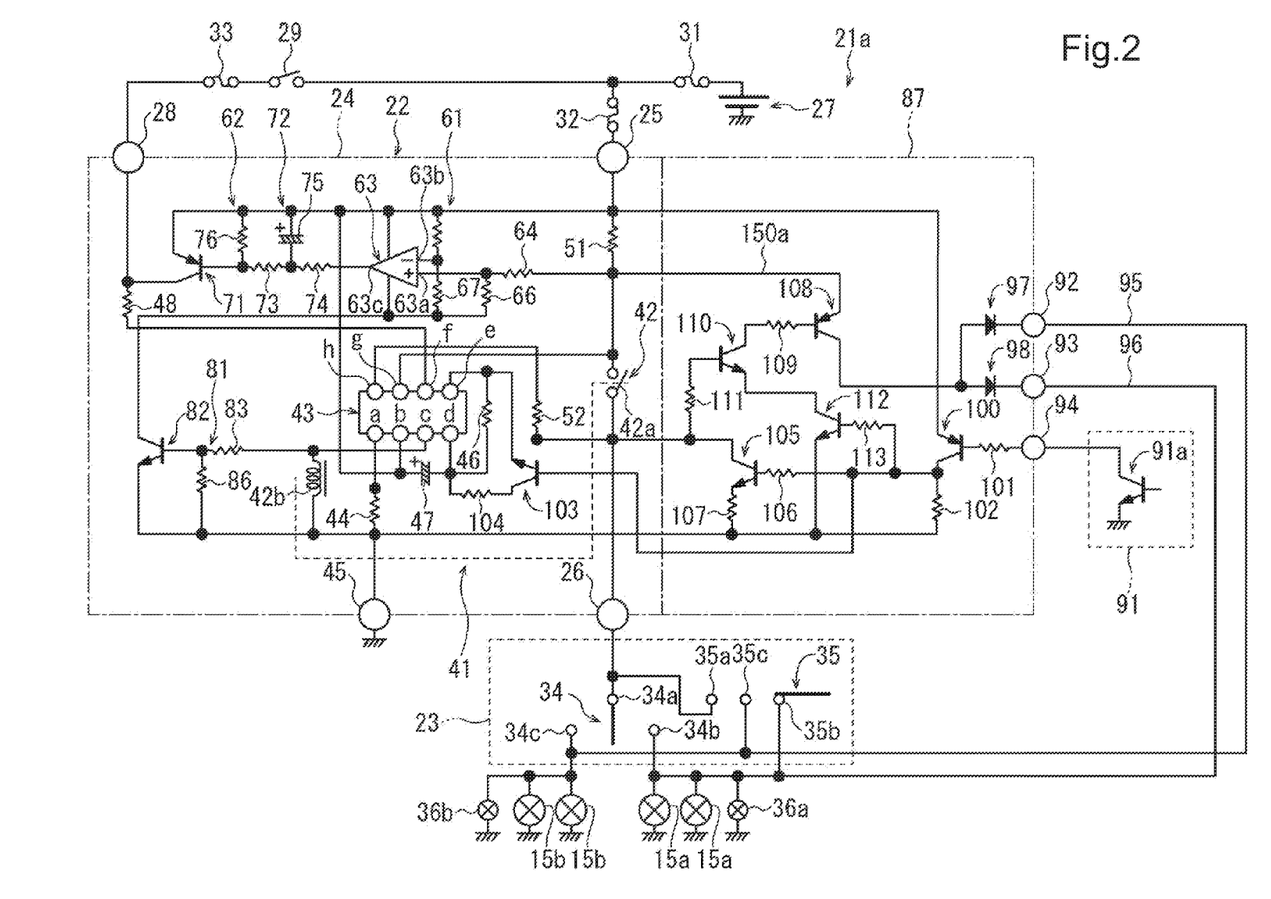
FIG. 2 is a circuit diagram showing the configuration of a turn signal control device according to an embodiment of the present invention.
Figure 3:
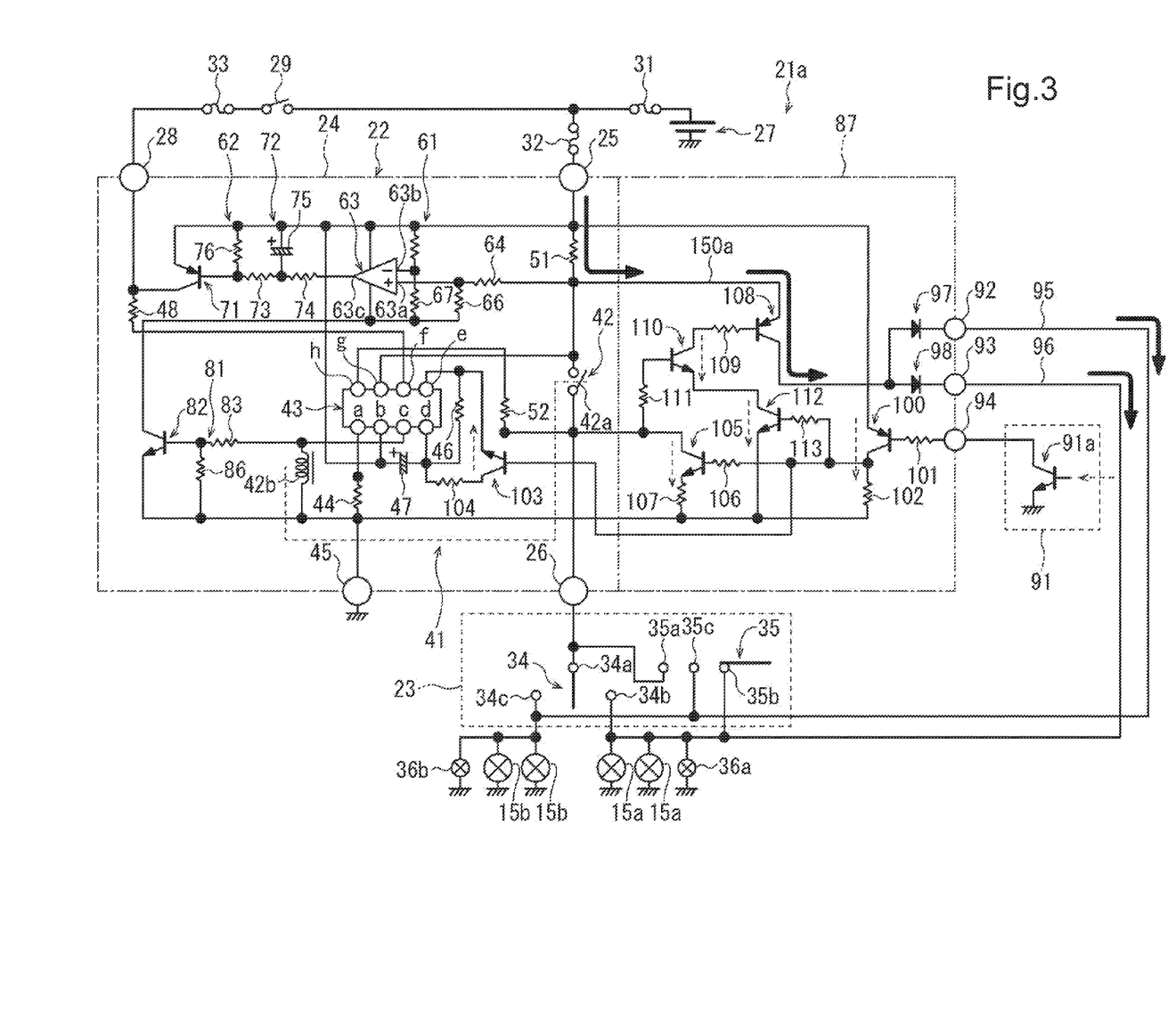
FIG. 3 is a view for describing operations when the ESS function is activated in the circuit diagram of FIG. 2.

FIG. 2 is a circuit diagram showing the configuration of a turn signal control device 21a according to an embodiment of the present invention. FIG. 3 is a view for describing operations when the ESS function is activated. The turn signal control device 21a is configured to drive the left and right turn signal lamps 15a, 15b in three modes. Specifically, the modes include: a turn signal function of making the left or right turn signal lamps 15a or 15b flash to indicate the travelling direction of the motorcycle 11; a hazard lamp function of making the left and right turn signal lamps 15a, 15b flash simultaneously to indicate that the vehicle will come to an emergency stop on the road, due to failure or other reasons; and an emergency stop signal function (also referred to as an ESS function below) of making the left and right turn signal lamps 15a, 15b flash simultaneously in a shorter flashing cycle than for the hazard lamp function, to notify following and other vehicles of sharp deceleration of the motorcycle 11.

Of the three modes, the turn signal function and the hazard lamp function are activated by operation of the operation means provided in the switch unit 23. Meanwhile, the ESS function is activated when a predetermined sharp-deceleration condition is met, regardless of the rider's switch operation.

A driving power supply terminal 25 and a driving output terminal 26 are provided in a case 24 of a control unit 22. The driving power supply terminal 25 is connected to a battery 27 mounted on the vehicle body 12, and a drive current inputted into the driving power supply terminal 25 from the battery 27 is outputted from the driving output terminal 26.

A control power supply terminal 28 of the control unit 22 is connected to the battery 27 through a main switch 29, and when the main switch 29 is turned on, a control current is supplied to the control power supply terminal 28 from the battery 27. Each of fuses 31, 32, 33 has a function of interrupting overcurrent.

The switch unit 23 has a turn signal switch 34 for making the left or right turn signal lamps 15a or 15b flash, and a hazard lamp switch 35 for making the left and right turn signal lamps 15a, 15b flash simultaneously. The switches 34, 35 as operation means are connected parallel to each other between the driving output terminal 26 and the turn signal lamps 15a, 15b (between the battery 27 and the turn signal lamps 15a, 15b).

The turn signal switch 34 has a common contact point 34a connected to the driving output terminal 26, a right contact point 34b connected to the right turn signal lamps 15a, and a left contact point 34c connected to the left turn signal lamps 15b. A rider's operation selectively connects the common contact point 34a to the right contact point 34b or the left contact point 34c. That is, when the turn signal switch 34 is turned on, the right or left turn signal lamps 15a or 15b are connected to the driving output terminal 26.

On the other hand, the hazard lamp switch 35 has a common contact point 35a connected to the driving output terminal 26, a right contact point 35b connected to the right turn signal lamps 15a, and a left contact point 35c connected to the left turn signal lamps 15b. When the hazard lamp switch 35 is turned on, the common contact point 35a is connected to both of the right contact point 35b and the left contact point 35c, so that both of the right turn signal lamps 15a and the left turn signal lamps 15b are connected to the driving output terminal 26.

The two right turn signal lamps 15a are connected parallel to each other, the two left turn signal lamps 15b are also connected parallel to each other, and the opposite terminals of the turn signal lamps 15a, 15b are grounded. The rider is notified of how the turn signal lamps 15a, 15b are lit, by pilot lamps 36a, 36b provided in a meter device of the vehicle.

A flash circuit 41 for making the turn signal lamps 15a, 15b flash is provided in the control unit 22. The flash circuit 41 as flashing cycle control means (a flashing cycle control device) has a switch 42 connected between the driving power supply terminal 25 and the driving output terminal 26 (between the battery 27 and the turn signal lamps 15a, 15b), and an integrated circuit 43 for driving the switch 42. Although a so-called turn signal relay formed of a relay switch and a relay coil is applied as the switch 42 in the embodiment, this may be replaced with a semiconductor switch (transistor) to configure the circuit. Additionally, in the case of applying a semiconductor switch as the switch 42, it may be provided inside the integrated circuit 43.

The switch 42 has a relay switch 42a that can connect and disconnect the driving power supply terminal 25 and the driving output terminal 26, and a relay coil 42b for opening and closing the relay switch 42a. The relay switch 42a is switched to a connected state when a current is supplied to the relay coil 42b. That is, when a current is supplied to the relay coil 42b, the relay switch 42a closes and a drive current from the battery 27 is supplied to the driving output terminal 26. Meanwhile, when the current supply to the relay coil 42b is stopped, the relay switch 42a opens and supply of the drive current to the driving output terminal 26 is stopped.

The integrated circuit 43 includes an unillustrated oscillator circuit, input detection circuit, voltage detection circuit and other components. The integrated circuit performs start-up and oscillation operations to drive the switch 42, when the turn signal switch 34 or the hazard lamp switch 35 is turned on. The integrated circuit 43 includes eight pins a to h which are terminals.

The first pin a for grounding is grounded through a resistor 44 and a ground terminal 45 provided in the case 24. The second pin b for voltage input is connected to the driving power supply terminal 25, and receives input of a voltage from the battery 27. The third pin c for output is connected to the ground terminal 45, through the relay coil 42b of the switch 42.

When the unillustrated oscillator circuit built inside the integrated circuit 43 is started, the third pin c is intermittently connected to the second pin b according to an oscillation cycle of the oscillator circuit. With this, a current is intermittently supplied to the relay coil 42b to open and close the relay switch 42a. The fourth pin d and the fifth pin e are for setting a time constant of the oscillator circuit. The time constant is set by a resistor 46 connected between the fourth pin d and the fifth pin e, and a capacitor 47 connected between the fourth pin d and the second pin b, while the oscillation cycle (flashing cycle) of the oscillator circuit is set according to charging and discharging of the capacitor 47. In other words, the resistor 46 and the capacitor 47 function as flashing cycle control means for controlling the flashing cycle of the turn signal lamps 15a, 15b.

The sixth pin f for power supply is connected to the control power supply terminal 28 through a resistor 48, and receives input of a control current for activating the flash circuit 41 from the battery 27, through the control power supply terminal 28 and the main switch 29. The seventh pin g for detecting disconnection of the turn signal lamps 15a, 15b is connected to the driving power supply terminal 25 through a resistor 51 for detecting disconnection of the turn signal lamps 15a, 15b, which is connected between the driving power supply terminal 25 and the driving output terminal 26.

When a voltage value of the resistor 51 inputted from the seventh pin g falls outside a specified range, the unillustrated voltage detection circuit built inside the integrated circuit 43 detects disconnection of the turn signal lamps 15a, 15b. Upon detection of the disconnection, the oscillation cycle of the oscillator circuit is sped up to notify the rider of the disconnection.

The eighth pin h for detecting input from the switch unit 23 is connected to the driving output terminal 26, through a resistor 52. The input detection circuit built inside the integrated circuit 43 detects that the turn signal switch 34 or hazard lamp switch 35 is turned on. When it is detected that the switch 34, 35 is turned on, the oscillator circuit is started to start operation of the switch 42, which makes the turn signal lamps 15a, 15b flash.

Moreover, the control unit 22 is provided with a display detection circuit 61 and a control current maintenance circuit 62, which are configured to keep the hazard lamp on even when the main switch 29 is turned off. The display detection circuit 61 has a comparator 63 connected between the driving power supply terminal 25 and the driving output terminal 26. A power supply terminal (not shown) of the comparator 63 is connected to the driving power supply terminal 25 and the ground terminal 45. A current supplied from the battery 27 through the driving power supply terminal 25 activates the comparator.

A non-inverting terminal 63a of the comparator 63 is connected to the driving power supply terminal 25 through a resistor 64 and the disconnection detective resistor 51. An inverting terminal 63b is connected to the driving power supply terminal 25 through a resistor 65. In addition, a resistor 66 is connected between the non-inverting terminal 63a and the ground terminal 45, while a resistor 67 is connected between the inverting terminal 63b and the ground terminal 45.

Same resistance values are set for the resistors 64, 65, and same resistance values are set for the resistors 66, 67. The resistors 64 to 67 and the disconnection detective resistor 51 are set, such that a higher voltage is applied to the inverting terminal 63b of the comparator 63 than to the non-inverting terminal 63a, only when the left and right turn signal lamps 15a, 15b are lit simultaneously. Hence, an L signal (negative voltage) is outputted from an output terminal 63c of the comparator 63, only when the left and right turn signal lamps 15a, 15b are lit simultaneously.

Meanwhile, the L signal is not outputted from the output terminal 63c of the comparator 63, when the turn signal switch 34 is turned on and the left or right turn signal lamps 15a or 15b are lit. Hence, the comparator 63 detects simultaneous lighting of the left and right turn signal lamps 15a, 15b by referring to voltage values at the front and rear of the disconnection detective resistor 51, and accordingly outputs an L signal as a detection signal.

The control current maintenance circuit 62 has a PNP transistor 71 as a switching element and an RC timer circuit 72. The collector of the transistor 71 is connected to the driving power supply terminal 25, and the emitter is connected to the sixth pin 43f of the integrated circuit 43 through a resistor 48. That is, the transistor 71 is connected in parallel with the main switch 29, between the battery 27 and the flash circuit 41.

The base of the transistor 71 is connected the output terminal 63c of the comparator 63 through two resistors 73, 74, and the transistor 71 is switched to ON by an L signal from the comparator 63. Meanwhile, the RC timer circuit 72 includes a capacitor 75 and a resistor 76, which are connected in parallel between the base of the transistor 71 and the driving power supply terminal 25.

The capacitor 75 is charged by an L signal from the comparator 63, and is discharged to keep the transistor 71 ON when the L signal is not outputted from the comparator 63, i.e., when the turn signal lamps 15a, 15b are OFF. Accordingly, when an L signal is outputted from the comparator 63, the transistor 71 is energized, and a control current from the battery 27 is supplied to the sixth pin 43f for power supply of the integrated circuit 43, through the transistor 71.

Additionally, the control unit 22 is provided with a power saving circuit 81, which is configured to suppress power consumption by stopping the comparator 63, when the turn signal lamps 15a, 15b are turned off during flashing of the hazard lamp. The power saving circuit 81 has an NPN transistor 82, whose base is connected to the third pin c of the integrated circuit 43 through a resistor 83, collector is connected to a power supply terminal (not shown) of the comparator 63, and emitter is connected to the ground terminal 45.

A resistor 86 is connected between the base of the transistor 82 and the ground terminal 45. Hence, when the oscillator circuit of the integrated circuit 43 is started, a current is supplied to the transistor 82 as well as to the relay coil 42b from the third pin c of the integrated circuit 43. This energizes the transistor 82, and a current is supplied to the comparator 63. That is, the comparator 63 is activated only when a current is supplied to the relay coil 42b and the turn signal lamps 15a, 15b are lit. The comparator 63 stops when supply of the current to the relay coil 42b is stopped, and the turn signal lamps 15a, 15b are turned off.

In the turn signal control device 21a, when the main switch 29 is OFF, the control current is not supplied to the control power supply terminal 28, and the transistor 71 of the control current maintenance circuit 62 is OFF. Accordingly, the control current is not supplied to the sixth pin 43f for power supply of the integrated circuit 43, and therefore the turn signal lamps 15a, 15b do not flash even when the turn signal switch 34 or the hazard lamp switch 35 is turned on. That is, if the main switch 29 is kept off, the turn signal lamps 15a, 15b are not lit even when the turn signal switch 34 or the hazard lamp switch 35 of the parked vehicle is unnecessarily operated, for example.

Operations of the turn signal function and the hazard lamp function according to the turn signal control device 21a will be confirmed. First, when the main switch 29 is turned on, a control current is supplied to the sixth pin 43f of the integrated circuit (control IC) 43 from the battery 27, through the control power supply terminal 28, to start the integrated circuit 43. When the turn signal switch 34 is turned on to the right or left while the integrated circuit 43 is active, the turn signal lamps 15a or 15b are connected to the driving output terminal 26 through the turn signal switch 34. At the same time, the input detection circuit of the integrated circuit 43 detects that the turn signal switch 34 is turned on, whereby the oscillator circuit is started to start opening and closing of the switch 42. With this, a drive current is intermittently supplied to the left or right turn signal lamps 15a or 15b to make them flash.

Meanwhile, when the hazard lamp switch 35 is turned on while the main switch 29 is ON, the left and right turn signal lamps 15a, 15b are connected to the driving output terminal 26 through the hazard lamp switch 35. At the same time, the input detection circuit of the integrated circuit 43 detects that the hazard lamp switch 35 is turned on, whereby the oscillator circuit is started to start opening and closing of the switch 42. With this, a drive current is intermittently supplied to the left and right turn signal lamps 15a, 15b to carry out the hazard lamp function, in which both left and right lamps flash simultaneously.

Moreover, according to operations of the display detection circuit 61 and the control current maintenance circuit 62, even when the main switch 29 is turned off while the hazard lamp switch 35 is ON and the left and right turn signal lamps 15a, 15b are lit in the hazard lamp mode, the turn signal lamps 15a, 15b are kept on in the hazard lamp mode. That is, when the hazard lamp switch 35 is turned on and the left and right turn signal lamps 15a, 15b in the hazard lamp mode are lit simultaneously, an L signal is outputted from the comparator 63 of the display detection circuit 61, and a control current is supplied to the integrated circuit 43 through the transistor 71.

Also, when the left and right turn signal lamps 15a, 15b in the hazard lamp mode are turned off simultaneously, the transistor 71 is kept energized by the RC timer circuit 72, and a control current is supplied to the integrated circuit 43 through the transistor 71. Thus, a control current is supplied to the integrated circuit 43 even when the main switch 29 is turned off, and the hazard lamp is kept on.

Meanwhile, when the main switch 29 is turned off while the turn signal switch 34 is ON and the left or right turn signal lamps 15a or 15b are flashing, the comparator 63 does not output the L signal. Hence, the transistor 71 is turned off, the control current is not supplied to the integrated circuit 43, and the turn signal lamps 15a, 15b stop flashing.

The turn signal control device 21a according to the embodiment is provided with bypass means (a bypass device) 87 as an ESS (emergency stop signal) controller configured of an analogue circuit, which is added to the circuit of the aforementioned control unit 22. The ESS function is activated when sharp deceleration-detection means (a sharp deceleration-detection device) 91 detects a sharp deceleration-detection signal.

A component such as a controller of an ABS device, which intermittently releases locking of a braking device at the time of sharp deceleration, is connected to the base of a transistor 91a constituting the sharp deceleration-detection means 91. In the embodiment, a sharp deceleration-detection signal is outputted from the controller of the ABS device when a sharp-deceleration condition is met, the condition consisting of a predetermined vehicle speed, deceleration speed of the vehicle, and whether or not the brake is operated, for example.

The bypass means 87 is configured to supply electric power to the left and right turn signal lamps 15a, 15b through bypass passages 95, 96 upon detection of a sharp deceleration-detection signal, even if the turn signal switch 34 or the hazard lamp switch 35 is OFF. The bypass means 87 connects the upstream side of the operation means 34, 35 and the downstream side of the operation means 34, 35. More specifically, the bypass means 87 connects the upstream side of the switch 42 and the downstream side of the operation means 34, 35.

The base of a PNP transistor 100 is connected to the collector of the NPN transistor 91a, through a signal detection terminal 94 and a resistor 101. The emitter of the transistor 100 is connected to the upstream side of the disconnection detective resistor 51. Additionally, a resistor 113 is connected to the upstream of the base of a transistor 112, while a resistor 106 is connected to the upstream of the base of a transistor 105. Furthermore, the collector of the transistor 100 is connected to the upstream side of the ground terminal 45 through a resistor 102. When the transistor 100 is turned on, a switching signal is inputted into the bases of the NPN transistors 112, 105, 103.

The emitter of the transistor 103 as switch means (a switch device) is connected to the fifth pin e of the integrated circuit 43, and the collector thereof is connected to the fourth pin d through a resistor 104. As has been described, the fourth pin d and fifth pin e of the integrated circuit 43 are used to set the time constant of the oscillator circuit. During operation of the ESS function, the time constant is set by the resistor 46 used during operation of the turn signal function and the hazard lamp function, the resistor 104, and the capacitor 47, while the oscillation cycle of the oscillator circuit is set according to charging and discharging of the capacitor 47. In other words, in the embodiment, the transistor 103 and the resistor 104 serve as flashing cycle modification means (a flashing cycle modification device). Since the transistor 103 and the resistor 104 are added to the original turn signal driver circuit, they belong to the bypass means 87. Similarly, the bypass passages 95, 96 also belong to the bypass means 87.

The emitter of a PNP transistor 108 is connected between the disconnection detective resistor 51 and the switch 42, through wiring 150a as an electric power supply route. The collector of the transistor 108 is connected to rectifier diodes 97, 98 and driving output terminals 92, 93. In the embodiment, the route passing through the emitter and collector of the transistor 108 forms a bypass circuit, and lights the left and right turn signal lamps 15a, 15b simultaneously.

The collector of the NPN transistor 105 is connected to the downstream side of the switch 42, and is thereby connected to the eighth pin h through the resistor 52. Hence, when the sharp deceleration-detection means detects a sharp deceleration-detection signal, the transistor 105 is turned on, so that the same signal as that inputted when the turn signal switch 34 or the hazard lamp switch 35 is turned on is inputted into the eighth pin h. When input of the signal starts the unillustrated oscillator circuit built inside the integrated circuit 43, the third pin c is intermittently connected to the second pin b according to the oscillation cycle of the oscillator circuit. With this, a current is intermittently supplied to the relay coil 42b to open and close the relay switch 42a.

The base of the transistor 108 is connected to the collector of a transistor 110 through a resistor 109. The emitter of the transistor 110 is connected to the collector of the transistor 112, while the base of the transistor 110 is connected to the collector of the transistor 105 through a resistor 111. The emitter of the transistor 105 is connected to the ground terminal 45 through a resistor 107.

During operation of the ESS function, a base current of the transistor 108 is generated in synchronization with opening and closing of the relay switch 42a. This is used as a switching current to turn on and off the transistor 108. Since the oscillation cycle of the switch 42 is determined according to the time constant set by the resistor 104 and the capacitor 47, the flashing cycle for the ESS function can be easily differed from the flashing cycle for the hazard lamp function by setting the resistor 104.

With the above configuration, the bypass means 87 according to the embodiment can implement the ESS function having a shorter flashing cycle than the hazard lamp function, by adding a simple analogue circuit. Also, since the switch 42 and the bypass passages 95, 96 are connected in parallel, the large current for driving the turn signal lamps 15a, 15b can be supplied through a different system that does not include the relay switch 42a.

Figure 4:
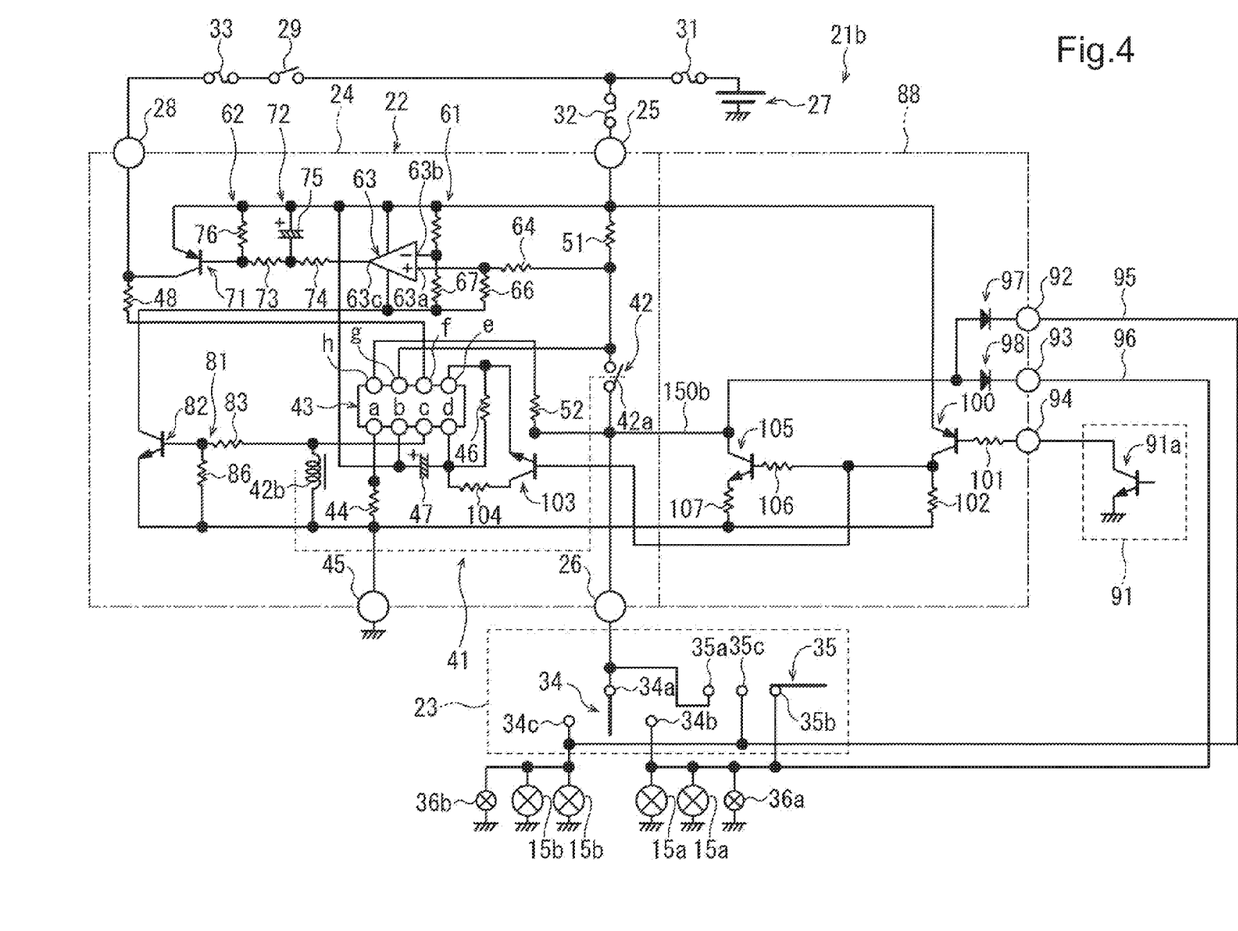
FIG. 4 is a circuit diagram showing the configuration of a turn signal control device according to a second embodiment of the present invention.
Figure 5:
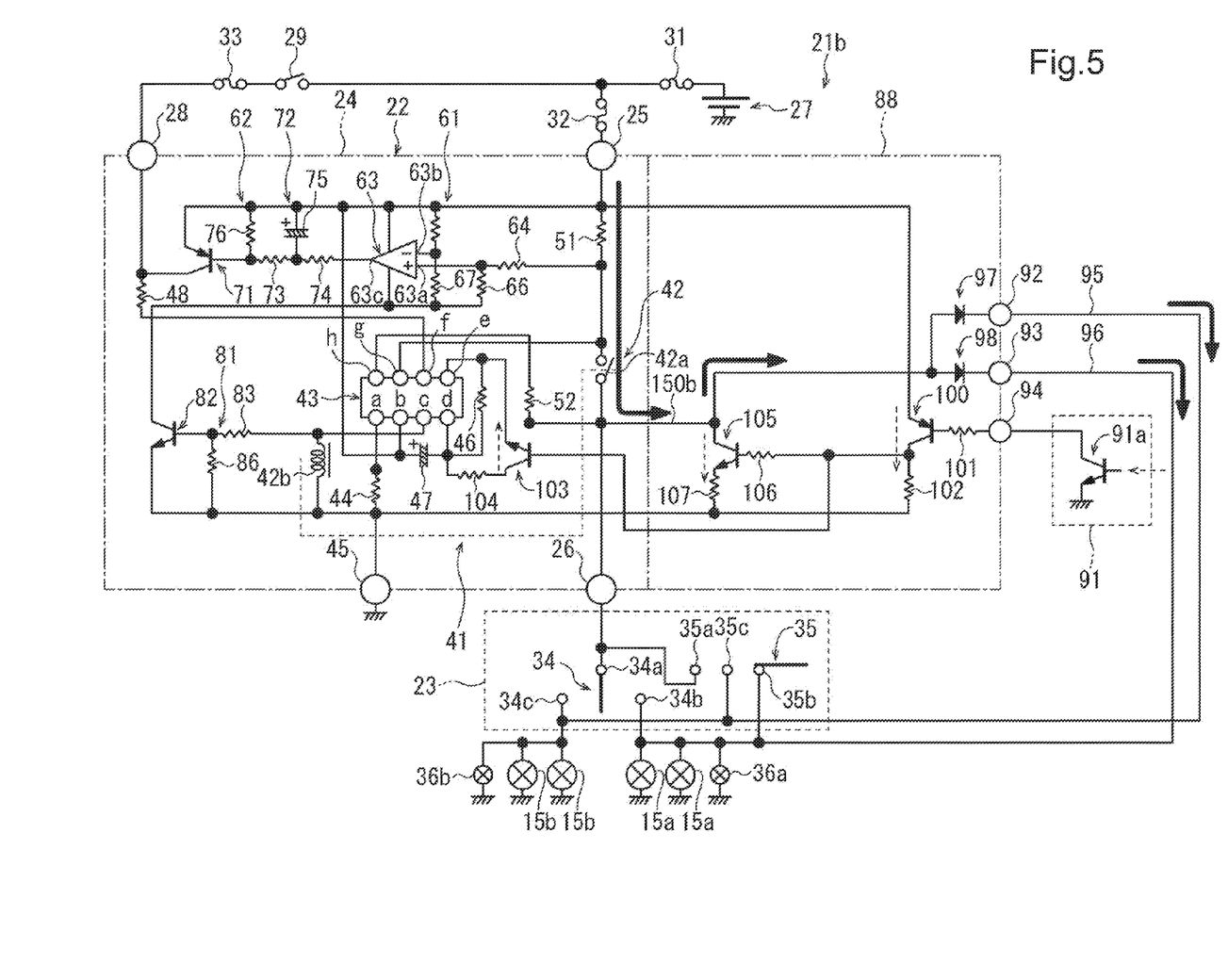
FIG. 5 is a view for describing operations when the ESS function is activated in the circuit diagram of FIG. 4.

FIG. 4 is a circuit diagram showing the configuration of a turn signal control device 21b according to a second embodiment of the present invention. FIG. 5 is a view for describing operations when the ESS function is activated. The turn signal control device 21b according to the embodiment includes second bypass means 88, which connects the upstream side of operation means 34, 35, and the downstream side of the operation means 34, 35. More specifically, the second bypass means 88 connects the downstream side of a switch 42 and the downstream side of the operation means 34, 35. Since the configuration except for the second bypass means 88 is the same as the aforementioned embodiment, descriptions thereof will be omitted.

The second embodiment is characterized in that a drive current of turn signal lamps 15a, 15b is supplied to bypass passages 95, 96 through a relay switch 42a. According to the configuration, if the relay switch 42a can allow a large current for simultaneously lighting the left and right turn signal lamps 15a, 15b to pass therethrough, i.e., has a configuration that supports the hazard lamp function, the ESS function can be configured even simpler than in the first embodiment.

The base of a PNP transistor 100 is connected to the collector of an NPN transistor 91a, through a signal detection terminal 94 and a resistor 101. The emitter of the transistor 100 is connected to the upstream side of a disconnection detective resistor 51. When the transistor 100 is turned on, a switching signal is inputted into the bases of NPN transistors 105, 103. A resistor 106 is connected to the upstream of the base of the transistor 105. Furthermore, the collector of the transistor 100 is connected to the upstream side of a ground terminal 45 through a resistor 102.

The emitter of the transistor 103 as switch means is connected to a fifth pin e of an integrated circuit 43, and the collector thereof is connected to a fourth pin d through a resistor 104. As has been described, the fourth pin d and fifth pin e of the integrated circuit 43 are used to set the time constant of an oscillator circuit. During operation of the ESS function, the time constant is set by a resistor 46 used during operation of the turn signal function and the hazard lamp function, the resistor 104, and a capacitor 47, while the oscillation cycle of the oscillator circuit is set according to charging and discharging of the capacitor 47. In other words, in the embodiment, the transistor 103 and the resistor 104 serve as flashing cycle modification means.

In the embodiment, the route connected to the collector of the transistor 105 forms a bypass circuit, and lights the left and right turn signal lamps 15a, 15b simultaneously. The emitter of the transistor 105 is connected to the ground terminal 45 through a resistor 107. The collector of the transistor 105 is connected to the downstream side of the switch 42 through wiring 150b as an electric power supply rout, and is thereby connected to an eighth pin h through a resistor 52.

Hence, when a sharp deceleration-detection means detects a sharp deceleration-detection signal, the transistor 105 is turned on, so that the same signal as that inputted when the turn signal switch 34 or the hazard lamp switch 35 is turned on is inputted into the eighth pin h. When input of the signal starts the unillustrated oscillator circuit built inside the integrated circuit 43, a third pin c is intermittently connected to a second pin b according to the oscillation cycle of the oscillator circuit. With this, a current is intermittently supplied to a relay coil 42b.

Then, the intermittent supply of current to the relay coil 42b opens and closes the relay switch 42a. Since the switch 42 and the bypass passages 95, 96 are connected in series in the embodiment, when the relay switch 42a closes, the drive current of the turn signal lamps 15a, 15b passes through the relay switch 42a and is supplied to the bypass passages 95, 96.

Figure 6:
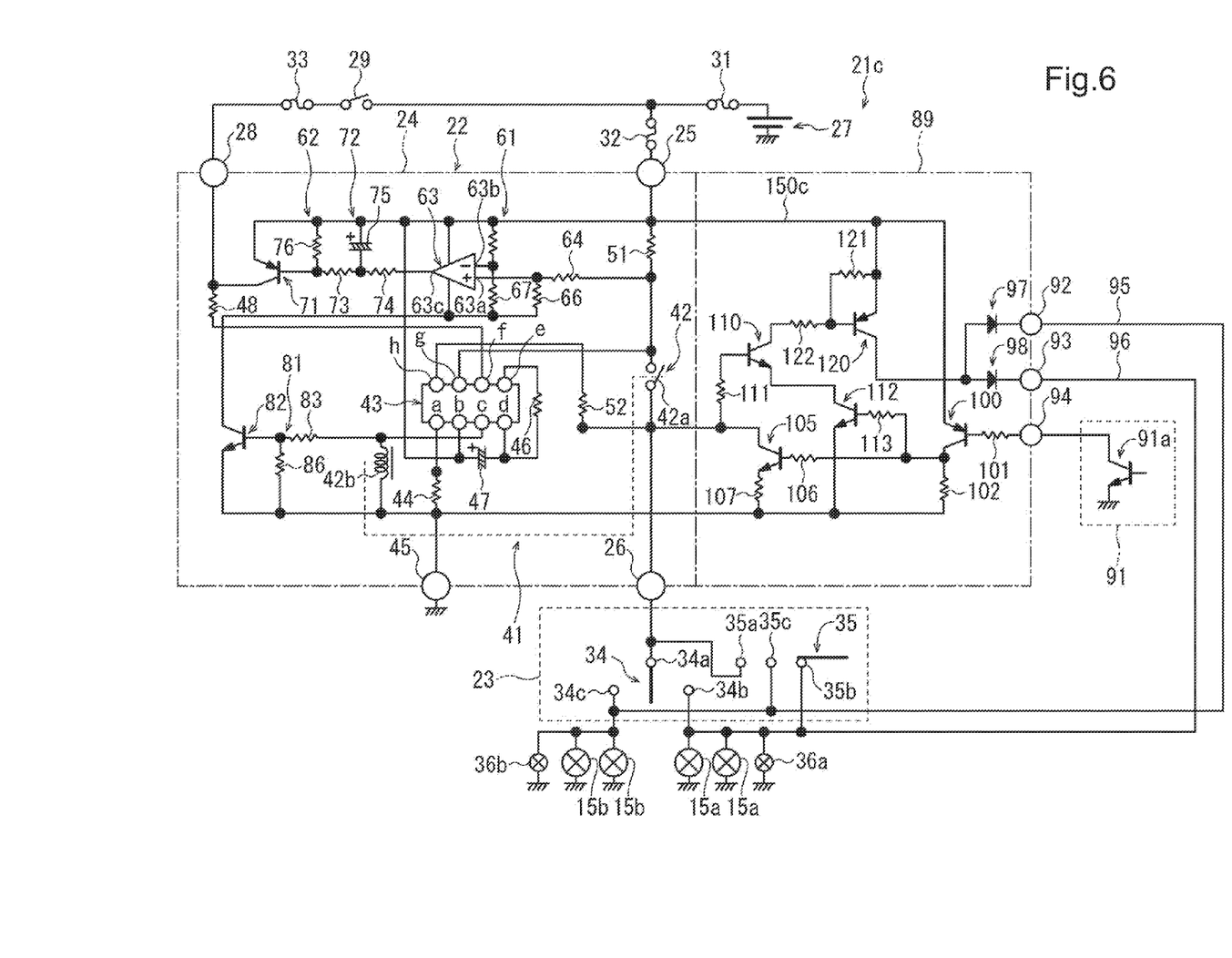
FIG. 6 is a circuit diagram showing the configuration of a turn signal control device according to a third embodiment of the present invention.
Figure 7:
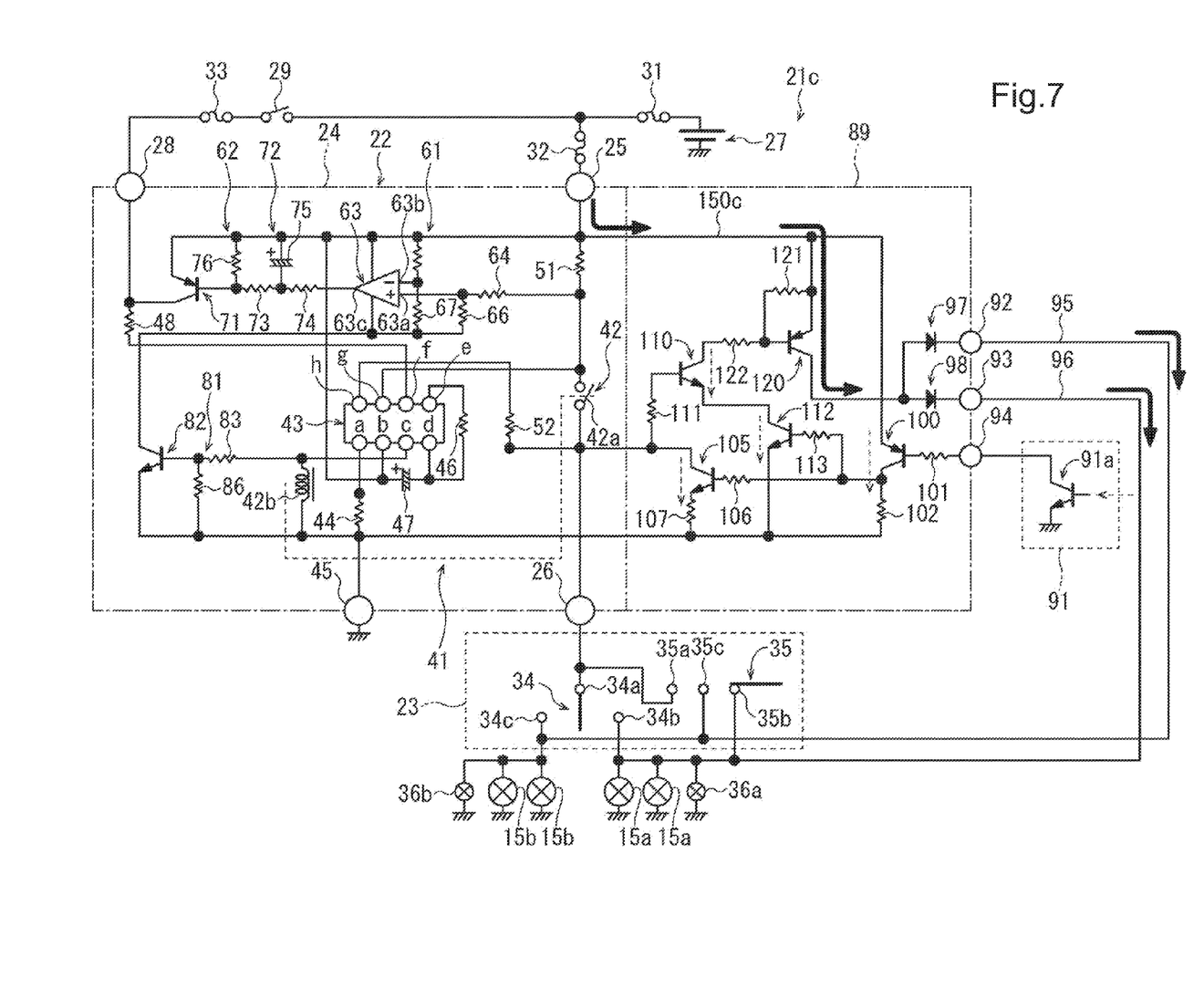
FIG. 7 is a view for describing operations when the ESS function is activated in the circuit diagram of FIG. 6.

FIG. 6 is a circuit diagram showing the configuration of a turn signal control device 21c according to a third embodiment of the present invention. FIG. 7 is a view for describing operations when the ESS function is activated. The turn signal control device 21c according to the embodiment includes third bypass means 89 connecting the upstream side of operation means 34, 35 and the downstream side of the operation means 34, 35. More specifically, the third bypass means 89 connects the upstream side of a switch 42 and the downstream side of the operation means 34, 35. Since the configuration except for the third bypass means 89 is the same as the aforementioned embodiments, descriptions thereof will be omitted.

The third embodiment is characterized in that a flashing cycle modification function for disconnection detection, which is provided to an integrated circuit 43, is used to modify the flashing cycle during operation of the ESS function. In the embodiment, the integrated circuit 43 serves as flashing cycle modification means. According to the configuration, a transistor and resistor for modifying the time constant can be omitted, while supplying a large current for driving turn signal lamps 15a, 15b through a different system that does not include a relay switch 42a.

The base of a PNP transistor 100 is connected to the collector of an NPN transistor 91a, through a signal detection terminal 94 and a resistor 101. The emitter of the transistor 100 is connected to the upstream side of a disconnection detective resistor 51. When the transistor 100 is turned on, a switching signal is inputted into the bases of NPN transistors 112, 105. A resistor 113 is connected to the upstream of the base of the transistor 112, while a resistor 106 is connected to the upstream of the base of the transistor 105. Furthermore, the collector of the transistor 100 is connected to the upstream side of a ground terminal 45 through a resistor 102.

The embodiment does not include a transistor and resistor for modifying the time constant based on a resistor 46 and a capacitor 47. Instead, the voltage value of the disconnection detective resistor 51 falls outside the standard value, when a drive current of the turn signal lamps 15a, 15b in the ESS function passes therethrough. Thus, the same flashing cycle as is applied when disconnection is detected is applied during operation of the ESS function.

The emitter of a PNP transistor 120 is connected to the upstream side of the disconnection detective resistor 51, through wiring 150c as an electric power supply route. The collector of the transistor 120 is connected to rectifier diodes 97, 98 and driving output terminals 92, 93. In the embodiment, the route passing through the emitter and collector of the transistor 120 forms a bypass circuit, and lights the left and right turn signal lamps 15a, 15b simultaneously.

The collector of the NPN transistor 105 is connected to the downstream side of the switch 42, and is thereby connected to an eighth pin h through a resistor 52. Hence, when a sharp deceleration-detection means detects a sharp deceleration-detection signal, the transistor 105 is turned on, so that the same signal as that inputted when the turn signal switch 34 or the hazard lamp switch 35 is turned on is inputted into the eighth pin h. When input of the signal starts an unillustrated oscillator circuit built inside the integrated circuit 43, a third pin c is intermittently connected to a second pin b according to the oscillation cycle of the oscillator circuit. With this, a current is intermittently supplied to a relay coil 42b to open and close the relay switch 42a.

The base of the transistor 120 is connected to the collector of a transistor 110 through a resistor 122. A resistor 121 for supplying a current from the emitter side to the base side is connected in parallel, between the base and emitter of the transistor 120. Also, the emitter of the transistor 110 is connected to the collector of the transistor 112, while the base of the transistor 110 is connected to the collector of the transistor 105 through a resistor 111. The emitter of the transistor 105 is connected to the ground terminal 45 through a resistor 107.

As has been described, since the emitter of a transistor 120 is connected to the upstream side of the disconnection detective resistor 51, the voltage value of the resistor 51 falls outside the standard value when the ESS function is activated, so that the oscillation cycle of the oscillator circuit of the relay switch 42a is sped up as in the case of detection of disconnection.

When a base current of the transistor 110 is generated in synchronization with opening and closing of the relay switch 42a, the base current is used as a switching current to turn on and off the transistor 110. Turning on and off the transistor 110 turns on and off the transistor 121, whereby a drive current of the turn signal lamps 15a, 15b is supplied to bypass passages 95, 96.

With the above configuration, the third bypass means 89 according to the embodiment can implement the ESS function having a shorter flashing cycle than the hazard lamp function, by utilizing an existing disconnection detection function of the integrated circuit 43. Also, the large current for driving the turn signal lamps 15a, 15b can be supplied through a different system that does not include the relay switch 42a.

Note that the form of turn signal lamps, to provide or not to provide a hazard lamp switch, the configuration of bypass means, the form and connection of transistors and resistors, and other conditions are not limited to the above embodiments, and various modifications are possible. For example, the transistors are not limited to NPN and PNP types, and other switching elements such as an FET may be used. The turn signal control device of the embodiment of the present invention is not limited to use in a motorcycle, but is also applicable to various vehicles including straddle type three-wheeled and four-wheeled vehicles.

The embodiment of the present invention is a turn signal control device (21a, 21b, 21c) having a circuit in which a turn signal lamp (15a, 15b) is connected to the downstream side of a power source (27) through a switch (42) and operation means (34, 35), the operation means (34, 35) being turned on to open and close the switch (42) according to a flashing cycle determined by flashing cycle control means (41), so that the turn signal lamp (15a, 15b) flashes, the turn signal control device including: sharp deceleration-detection means (91) configured to output a sharp deceleration-detection signal when sharp deceleration of a vehicle (11) is detected; bypass means (87, 88, 89) connecting the upstream side of the operation means (34, 35) and the downstream side of the operation means (34, 35); and flashing cycle modification means (43, 103, 104) configured to modify the flashing cycle determined by the flashing cycle control means (41), according to output of the sharp deceleration-detection signal, having a first characteristic that when the sharp deceleration-detection signal is outputted, both the flashing cycle modification means (43, 103, 104) and the bypass means (87, 88, 89) are activated, to connect the upstream side of the operation means (34, 35) and the downstream side of the operation means (34, 35) according to the modified flashing cycle.

Also, the second characteristic is that: the bypass means (87, 89) connects the upstream side of the switch (42) and the downstream side of the operation means (34, 35); a bypass passage (95, 96) included in the bypass means (87, 89) is connected in parallel with the switch (42); and the bypass means (87, 89) supplies electric power to the turn signal lamp (15a, 15b) without passing through the switch (42), according to a switching signal based on opening and closing of the switch (42).

Also, the third characteristic is that: the bypass means (88) connects the downstream side of the switch (42) and the downstream side of the operation means (34, 35); a bypass passage (95, 96) included in the bypass means (88) is connected in series with the switch (42); and the bypass means (88) supplies electric power to the turn signal lamp (15a, 15b) through the switch (42), according to opening and closing of the switch (42).

Also, the fourth characteristic is that: the flashing cycle control means (41) determines the flashing cycle according to a time constant determined by a resistor (46) and a capacitor (47); and the flashing cycle modification means (103, 104) modifies the flashing cycle by switching a resistance value of the resistor (46) to a different resistance value by switch means (103).

Also, the fifth characteristic is that: the flashing cycle control means (41) determines the flashing cycle according to a time constant determined by a resistor (46) and a capacitor (47); and the flashing cycle modification means (43) modifies the flashing cycle by applying a flashing cycle pre-stored in an integrated circuit (43).

Also, the sixth characteristic is that: the flashing cycle pre-stored in the integrated circuit (43) is applied when a voltage value of a resistor (51) connected between the power source (27) and the switch (42) becomes equal to or lower than a predetermined value, and therefore it is judged that the turn signal lamp (15a, 15b) is disconnected; and the bypass passage (95, 96) is connected to the upstream side of the resistor (51).

Moreover, the seventh characteristic is that output of the sharp deceleration-detection signal makes the turn signal lamps (15a, 15b) provided on the left and right of the vehicle (11) flash simultaneously.

According to the first characteristic, a turn signal control device includes: sharp deceleration-detection means (91) configured to output a sharp deceleration-detection signal when sharp deceleration of a vehicle (11) is detected; bypass means (87, 88, 89) connecting the upstream side of the operation means (34, 35) and the downstream side of the operation means (34, 35); and flashing cycle modification means (43, 103, 104) configured to modify the flashing cycle determined by the flashing cycle control means (41), according to output of the sharp deceleration-detection signal, and when the sharp deceleration-detection signal is outputted, both the flashing cycle modification means (43, 103, 104) and the bypass means (87, 88, 89) are activated, to connect the upstream side of the operation means (34, 35) and the downstream side of the operation means (34, 35) according to the modified flashing cycle. Hence, it is possible to make the turn signal lamp flash when sharp deceleration is detected, by only adding a simple circuit to a circuit that makes the turn signal lamp flash by use of a switch. Additionally, the lamp is allowed to flash in a different flashing cycle from that for the turn signal function or the hazard lamp function.

According to the second characteristic, the bypass means (87, 89) connects the upstream side of the switch (42) and the downstream side of the operation means (34, 35); a bypass passage (95, 96) included in the bypass means (87, 89) is connected in parallel with the switch (42); and the bypass means (87, 89) supplies electric power to the turn signal lamp (15*a*, 15*b*) without passing through the switch (42), according to a switching signal based on opening and closing of the switch (42). Hence, a large current for driving the turn signal lamp can be supplied through a different system that does not include the switch.

According to the third characteristic, the bypass means (88) connects the downstream side of the switch (42) and the downstream side of the operation means (34, 35); a bypass passage (95, 96) included in the bypass means (88) is connected in series with the switch (42); and the bypass means (88) supplies electric power to the turn signal lamp (15*a*, 15*b*) through the switch (42), according to opening and closing of the switch (42). Hence, the drive current of the turn signal lamp can be supplied through the system including the switch, so that circuit configuration can be made simpler.

According to the fourth characteristic, the flashing cycle control means (41) determines the flashing cycle according to a time constant determined by a resistor (46) and a capacitor (47); and the flashing cycle modification means (103, 104) modifies the flashing cycle by switching a resistance value of the resistor (46) to a different resistance value by switch means (103). Hence, the flashing cycle can be modified by a simple electric element.

According to the fifth characteristic, the flashing cycle control means (41) determines the flashing cycle according to a time constant determined by a resistor (46) and a capacitor (47); and the flashing cycle modification means (43) modifies the flashing cycle by applying a flashing cycle pre-stored in an integrated circuit (43). Hence, if the integrated circuit has a function of detecting disconnection of the turn signal lamp and modifying the flashing cycle, for example, the function can be utilized to make the turn signal lamp flash in a different flashing cycle from those for the turn signal function and the hazard lamp function, upon detection of sharp deceleration.

According to the sixth characteristic, the flashing cycle pre-stored in the integrated circuit (43) is applied when a voltage value of a resistor (51) connected between the power source (27) and the switch (42) becomes equal to or lower than a predetermined value, and therefore it is judged that the turn signal lamp (15*a*, 15*b*) is disconnected; and the bypass passage (95, 96) is connected to the upstream side of the resistor (51). Hence, the voltage value of the resistor becomes equal to or lower than the predetermined value even when electric power is supplied to the turn signal lamp. Accordingly, it can be judged that the turn signal lamp is disconnected even through there is actually no disconnection in the turn signal lamp, to modify the flashing cycle.

According to the seventh characteristic, output of the sharp deceleration-detection signal makes the turn signal lamps (15*a*, 15*b*) provided on the left and right of the vehicle (11) flash simultaneously. Hence, a simple change in the circuit can achieve an emergency stop signal function, of notifying following and other vehicles of sharp deceleration of a vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A turn signal control apparatus including a circuit in which a turn signal lamp is connected to the downstream side of a power source through a switch and operation means,
    said operation means being turned on to open and close said switch according to a flashing cycle determined by flashing cycle control means, so that said turn signal lamp flashes, the turn signal control apparatus comprising:
    sharp deceleration-detection means configured to output a sharp deceleration-detection signal when sharp deceleration of a vehicle is detected;
    bypass means connecting the upstream side of said operation means and the downstream side of said operation means; and
    flashing cycle modification means configured to modify the flashing cycle determined by said flashing cycle control means, according to output of said sharp deceleration-detection signal, wherein
    when said sharp deceleration-detection signal is outputted, both said flashing cycle modification means and said bypass means are activated, to connect the upstream side of said operation means and the downstream side of said operation means according to the modified flashing cycle.

2. The turn signal control apparatus according to claim 1, wherein:
    said bypass means connects the upstream side of said switch and the downstream side of said operation means;
    a bypass passage included in said bypass means is connected in parallel with said switch; and
    said bypass means supplies electric power to said turn signal lamp without passing through said switch, according to a switching signal based on opening and closing of said switch.

3. The turn signal control apparatus according to claim 1, wherein:
    said bypass means connects the downstream side of said switch and the downstream side of said operation means;
    a bypass passage included in said bypass means is connected in series with said switch; and
    said bypass means supplies electric power to said turn signal lamp through said switch, according to opening and closing of said switch.

4. The turn signal control apparatus according to claim 1, wherein:
    said flashing cycle control means determines the flashing cycle according to a time constant determined by a resistor and a capacitor; and
    said flashing cycle modification means modifies the flashing cycle by switching a resistance value of said resistor to a different resistance value by switch means.

5. The turn signal control apparatus according to claim 1, wherein:
said flashing cycle control means determines the flashing cycle according to a time constant determined by a resistor and a capacitor; and
said flashing cycle modification means modifies the flashing cycle by applying a flashing cycle pre-stored in an integrated circuit.

6. The turn signal control apparatus according to claim 5, wherein:
the flashing cycle pre-stored in said integrated circuit is applied when a voltage value of a resistor connected between said power source and said switch becomes equal to or lower than a predetermined value, and therefore it is judged that said turn signal lamp is disconnected; and
said bypass passage is connected to the upstream side of said resistor.

7. The turn signal control apparatus according to claim 1, wherein
output of said sharp deceleration-detection signal makes said turn signal lamps provided on the left and right of said vehicle flash simultaneously.

8. A turn signal control apparatus comprising:
a switch to flash a turn signal lamp;
a flashing cycle control device to determine a flashing cycle;
an operation device to open and close the switch according to the flashing cycle determined by the flashing cycle control device so that the turn signal lamp flashes;
a sharp deceleration-detection device to output a sharp deceleration-detection signal in a case where sharp deceleration of a vehicle is detected;
a bypass device to electrically connect an upstream side of the operation device and a downstream side of the operation device; and
a flashing cycle modification device to modify the flashing cycle determined by the flashing cycle control device to produce a modified flashing cycle according to the sharp deceleration-detection signal, the flashing cycle modification device and the bypass device being configured to operate to electrically connect the upstream side of the operation device and the downstream side of the operation device according to the modified flashing cycle in a case where the sharp deceleration-detection signal is outputted.

9. The turn signal control apparatus according to claim 8, wherein the bypass device connects an upstream side of the switch and the downstream side of the operation device,
wherein a bypass passage included in the bypass device is connected in parallel with the switch, and
wherein the bypass device supplies electric power to the turn signal lamp so that the electric power does not pass through the switch, according to a switching signal based on opening and closing of the switch.

10. The turn signal control apparatus according to claim 8,
wherein the bypass device connects a downstream side of the switch and the downstream side of the operation device,
wherein a bypass passage included in the bypass device is connected in series with the switch, and
wherein the bypass device supplies electric power to the turn signal lamp through the switch, according to opening and closing of the switch.

11. The turn signal control apparatus according to claim 8,
wherein the flashing cycle control device determines the flashing cycle according to a time constant determined by a resistor and a capacitor, and
wherein the flashing cycle modification device modifies the flashing cycle by switching a resistance value of the resistor to a different resistance value using a switch device.

12. The turn signal control apparatus according to claim 8,
wherein the flashing cycle control device determines the flashing cycle according to a time constant determined by a resistor and a capacitor, and
wherein the flashing cycle modification device modifies the flashing cycle by applying a flashing cycle pre-stored in an integrated circuit.

13. The turn signal control apparatus according to claim 12,
wherein the flashing cycle pre-stored in the integrated circuit is applied in a case where a voltage value of a resistor connected between a power source and the switch becomes equal to or lower than a predetermined value so that a disconnection of the turn signal lamp is judged,
wherein a bypass passage included in the bypass device is connected to an upstream side of the resistor, and
wherein the turn signal lamp is connected to a downstream side of the power source through the switch.

14. The turn signal control apparatus according to claim 8,
wherein the turn signal lamp includes a left turn signal lamp and a right turn signal lamp which are provided on a left and a right of the vehicle, respectively, and
wherein output of the sharp deceleration-detection signal makes the left and right turn signal lamps flash simultaneously.

15. The turn signal control apparatus according to claim 8,
wherein the turn signal lamp is connected to a downstream side of a power source through the switch and the operation device.

16. The turn signal control apparatus according to claim 8,
wherein an ABC device is connected to the sharp deceleration-detection device,
wherein the ABC device outputs a second sharp deceleration-detection signal on detecting the sharp deceleration of the vehicle, and
wherein the sharp deceleration-detection device outputs the sharp deceleration-detection signal according to the second sharp deceleration-detection signal outputted from the ABC device.

17. The turn signal control apparatus according to claim 8,
wherein the flashing cycle control device comprises a flashing cycle control circuit,
wherein the operation device comprises an operation circuit,
wherein the sharp deceleration-detection device comprises a sharp deceleration-detection circuit,
wherein the bypass device comprises a bypass circuit, and
wherein the flashing cycle modification device comprises a flashing cycle modification circuit.

18. The turn signal control apparatus according to claim 11,
wherein the switch device comprises a switch circuit.

19. A turn signal control apparatus comprising:
switch means for flashing a turn signal lamp;
flashing cycle control means for determining a flashing cycle;
operation means for opening and closing the switch means according to the flashing cycle determined by the flashing cycle control means so that the turn signal lamp flashes;
sharp deceleration-detection means for outputting a sharp deceleration-detection signal in a case where sharp deceleration of a vehicle is detected;
bypass means for electrically connecting an upstream side of the operation means and a downstream side of the operation means; and
flashing cycle modification means for modifying the flashing cycle determined by the flashing cycle control means to produce a modified flashing cycle according to the sharp deceleration-detection signal, the flashing cycle modification means and the bypass means being configured to operate to electrically connect the upstream side of the operation means and the downstream side of the operation means according to the modified flashing cycle in a case where the sharp deceleration-detection signal is outputted.

20. A method of controlling a turn signal, comprising:
determining a flashing cycle;
opening and closing a switch to flash a turn signal lamp according to the flashing cycle;
outputting a sharp deceleration-detection signal in a case where sharp deceleration of a vehicle is detected;
modifying the flashing cycle to produce a modified flashing cycle according to the sharp deceleration-detection signal; and
operating a flashing cycle modification device and a bypass device to electrically connect an upstream side of an operation device and a downstream side of the operation device according to the modified flashing cycle in a case where the sharp deceleration-detection signal is outputted, the flashing cycle modification device being to modify the flashing cycle to produce the modified flashing cycle according to the sharp deceleration-detection signal, the bypass device being to electrically connect the upstream side of the operation device and the downstream side of the operation device, the operation device being to open and close the switch according to the flashing cycle so that the turn signal lamp flashes.

\* \* \* \* \*